(12) United States Patent
McLaughlin et al.

(10) Patent No.: US 8,333,945 B2
(45) Date of Patent: Dec. 18, 2012

(54) NANOPARTICLE ADDITIVES AND LUBRICANT FORMULATIONS CONTAINING THE NANOPARTICLE ADDITIVES

(75) Inventors: Michael Jeffrey McLaughlin, Richmond, VA (US); Naresh Mathur, Midlothian, VA (US)

(73) Assignee: Afton Chemical Corporation, Richmond, VA (US)

( * ) Notice: Subject to any disclaimer, the term of this patent is extended or adjusted under 35 U.S.C. 154(b) by 4 days.

(21) Appl. No.: 13/029,896

(22) Filed: Feb. 17, 2011

(65) Prior Publication Data

US 2012/0214717 A1  Aug. 23, 2012

(51) Int. Cl.
C10F 17/00 (2006.01)
C10M 125/10 (2006.01)

(52) U.S. Cl. ........ 423/263; 508/165; 977/773; 977/776; 977/777

(58) Field of Classification Search .................. 423/263; 508/165; 977/773, 776, 777
See application file for complete search history.

(56) References Cited

U.S. PATENT DOCUMENTS

| | | | |
|---|---|---|---|
| 2,384,577 A | 9/1945 | Thomas | |
| 2,710,872 A | 6/1955 | Thompson | |
| 2,786,766 A | 3/1957 | Hook et al. | |
| 2,897,152 A | 3/1959 | Elliott et al. | |
| 3,219,666 A | 11/1965 | Norman et al. | |
| 3,356,702 A | 12/1967 | Farmer et al. | |
| 3,407,222 A | 10/1968 | Lies | |
| 3,509,051 A | 4/1970 | Farmer et al. | |
| 3,565,804 A | 2/1971 | Honnen et al. | |
| 3,697,574 A | 10/1972 | Piasek et al. | |
| 3,736,357 A | 5/1973 | Piasek et al. | |
| 3,867,359 A | 2/1975 | Beadle | |
| 4,029,587 A | 6/1977 | Koch | |
| 4,098,705 A | 7/1978 | Sakurai et al. | |
| 4,164,473 A | 8/1979 | Coupland et al. | |
| 4,178,258 A | 12/1979 | Papay et al. | |
| 4,234,435 A | 11/1980 | Meinhardt et al. | |
| 4,259,195 A | 3/1981 | King et al. | |
| 4,261,843 A | 4/1981 | King et al. | |

(Continued)

FOREIGN PATENT DOCUMENTS

EP   0330522 B1   8/1989

(Continued)

OTHER PUBLICATIONS

Gao et al., "Fast Synthesis of Cerium Oxide Nanoparticles and Nanorods," Journal of Nanoscience and Nanotechnology, American Sceintific Publishers, USA, Dec. 2006, vol. 6, issue 12, pp. 3812-3819.

(Continued)

*Primary Examiner* — Jim Goloboy
(74) *Attorney, Agent, or Firm* — Luedeka Neely Group, P.C.

(57) ABSTRACT

A method for making a self-dispersing cerium oxide nanoparticles additive for lubricants, a lubricant composition containing the nanoparticles and a method for reducing boundary friction using the nanoparticles. The nanoparticles are made by an improved process of reacting a mixture of organo-cerium salt, fatty acid, and amine in the substantial absence of water and organic solvent at a temperature ranging from about 150° to about 250° C., the improvement comprising reacting the organo-cerium salt, fatty acid and amine in a molar ratio ranging from about 1:1:1 to about 1:2:2 in the reaction mixture to provide the reaction product comprising from about 20 to about 40% by weight of the nanoparticles in a substantially organic medium.

24 Claims, 1 Drawing Sheet

U.S. PATENT DOCUMENTS

| | | | |
|---|---|---|---|
| 4,263,152 A | 4/1981 | King et al. |
| 4,265,773 A | 5/1981 | deVries et al. |
| 4,266,945 A | 5/1981 | Karn |
| 4,272,387 A | 6/1981 | King et al. |
| 4,283,295 A | 8/1981 | deVries et al. |
| 4,285,822 A | 8/1981 | deVries et al. |
| 4,362,633 A | 12/1982 | Spence et al. |
| 4,369,119 A | 1/1983 | deVries et al. |
| 4,395,343 A | 7/1983 | de Vries et al. |
| 4,402,840 A | 9/1983 | deVries et al. |
| 4,466,901 A | 8/1984 | Hunt et al. |
| 4,636,322 A | 1/1987 | Nalesnik |
| 4,692,256 A | 9/1987 | Umemura et al. |
| 4,758,362 A | 7/1988 | Butke |
| 4,765,918 A | 8/1988 | Love et al. |
| 4,867,890 A | 9/1989 | Colclough et al. |
| 4,876,375 A | 10/1989 | Lam |
| 4,885,365 A | 12/1989 | Lam |
| 4,889,647 A | 12/1989 | Rowan et al. |
| 4,904,401 A | 2/1990 | Ripple et al. |
| 4,927,552 A | 5/1990 | Lam |
| 4,957,643 A | 9/1990 | Lam |
| 4,957,649 A | 9/1990 | Ripple et al. |
| 4,966,719 A | 10/1990 | Coyle et al. |
| 4,978,464 A | 12/1990 | Coyle et al. |
| 4,990,271 A | 2/1991 | Francis |
| 4,995,996 A | 2/1991 | Coyle et al. |
| 5,137,647 A | 8/1992 | Karol |
| 5,204,012 A | 4/1993 | Schaffhausen |
| 5,412,130 A | 5/1995 | Karol |
| 5,627,259 A | 5/1997 | Thaler et al. |
| 5,633,326 A | 5/1997 | Patil et al. |
| 5,643,859 A | 7/1997 | Gutierrez et al. |
| 5,686,397 A | 11/1997 | Baranski et al. |
| 5,693,598 A | 12/1997 | Abraham et al. |
| 5,789,357 A | 8/1998 | Baranski et al. |
| 5,792,729 A | 8/1998 | Harrison et al. |
| 5,851,965 A | 12/1998 | Harrison et al. |
| 5,853,434 A | 12/1998 | Harrison et al. |
| 5,902,776 A | 5/1999 | Dohner et al. |
| 5,936,041 A | 8/1999 | Diana et al. |
| 6,034,040 A | 3/2000 | Ozbalik et al. |
| 6,103,674 A | 8/2000 | Nalesnik et al. |
| 6,114,288 A | 9/2000 | Fujitsu et al. |
| 6,117,826 A | 9/2000 | Baranski et al. |
| 6,232,276 B1 | 5/2001 | Stiefel et al. |
| 6,506,493 B1 | 1/2003 | Kumar et al. |
| 6,509,303 B1 | 1/2003 | Gatto |
| 6,528,463 B1 | 3/2003 | Gatto et al. |
| 6,599,865 B1 | 7/2003 | Esche, Jr. et al. |
| 6,752,979 B1 | 6/2004 | Talbot et al. |
| 6,797,677 B2 | 9/2004 | Esche, Jr. et al. |
| 7,118,727 B2 | 10/2006 | Williams |
| 7,527,773 B2 | 5/2009 | Cao et al. |
| 7,754,173 B2 | 7/2010 | Cao et al. |
| 7,867,463 B2 | 1/2011 | Hyeon et al. |
| 2004/0266630 A1 | 12/2004 | George et al. |
| 2005/0124504 A1 | 6/2005 | Zhang et al. |
| 2006/0084278 A1 | 4/2006 | Winter et al. |
| 2007/0004602 A1 | 1/2007 | Waynick |
| 2007/0092423 A1* | 4/2007 | Hyeon et al. ............ 423/263 |
| 2007/0140951 A1 | 6/2007 | O'Brien et al. |
| 2007/0264834 A1 | 11/2007 | Strouse et al. |
| 2008/0161213 A1* | 7/2008 | Jao et al. ............ 508/165 |
| 2008/0175779 A1 | 7/2008 | Cao |
| 2010/0119429 A1 | 5/2010 | Mullins et al. |
| 2010/0212221 A1 | 8/2010 | Aradi |

FOREIGN PATENT DOCUMENTS

| | | |
|---|---|---|
| EP | 0348384 A2 | 12/1989 |
| EP | 1980609 A1 | 7/2006 |
| EP | 2048116 A1 | 4/2009 |
| JP | 07070576 A | 3/1995 |
| JP | 07118683 A | 5/1995 |
| JP | 2000226591 A | 8/2000 |
| JP | 2001172658 A | 6/2001 |
| JP | 2005213290 A | 8/2005 |
| WO | 9404638 A1 | 3/1994 |
| WO | 9900326 A1 | 1/1999 |
| WO | 2005012465 A1 | 2/2005 |
| WO | 2007085561 A1 | 8/2007 |

OTHER PUBLICATIONS

Sun et al, "Monodisperse MFe2O4 (M=Fe, Co, Mn) Nanoparticles," Journal of the American Chemical Society, 2004, 126, 273-279.

Komameni et al., "Microwave-Hydrothermal Synthesis of Nanophase Ferrites," Journal of the American Ceramic Society, 81, 11, pp. 3041-3043 (1998).

Wang et al, "Preparation of nanocrystalline ceria particles by sonochemical and microwave assisted heating methods," Physical Chemistry Chemical Physics, 2002, 4, pp. 3794-3799.

Nguyen et al., "Synthesis of monodispersed fcc and fct FePt/FePd nanoparticles by microwave irradiation," Journal of Material Chemistry, 2005, 15, pp. 5136-5143.

Iwaki et al., "Peparation of high coercivity magnetic FePt nanoparticles by liquid process," Journal of Applied Physics, 94, 10, Nov. 15, 2003.

Sun et al., "Controlled synthesis of CeO2 nanorods bya solvothermal method," Nanotechonology 16, 2005, pp. 1454-1463.

* cited by examiner

NANOPARTICLE ADDITIVES AND LUBRICANT FORMULATIONS CONTAINING THE NANOPARTICLE ADDITIVES

TECHNICAL FIELD

The embodiments described herein relate to methods for making nanoparticles for lubricant applications, and in particle methods that provide cerium oxide nanoparticles of a suitable shape and size for friction modification and wear reduction in fully formulated lubricant applications.

BACKGROUND AND SUMMARY

A lubricant may be a liquid, a paste, or a solid with liquid lubricants being the most used. Lubricating oils may be used in automobile engines, transmissions, bearings, gears, industrial gears and other machinery to reduce friction and wear and to increase fuel economy. A number of components including, but not limited to dispersants, detergents, friction modifiers, antiwear agents, antioxidants, and anti-corrosion additives are typically present in fully formulated lubricating oils. For many lubricant applications, a viscosity index improver may also be included as a major component.

With the energy resources depleting and more stringent environmental regulations being adopted, there exists a greater demand to increase a fuel economy of vehicles and to decrease emissions in vehicle exhausts. Currently, organic friction modifiers are added to the lubricating oils to increase fuel economy. However, the level of the fuel economy achievable by organic friction modifiers is limited. Hence, there is a need for alternate methods for achieving improvements in fuel economy.

One method for increasing fuel economy is to provide lower viscosity grade lubricating oils. While providing lower viscosity lubricating oils may dramatically increase fuel economy, such lubricating oils may also increase wear. Wear may be partially reduced by using antiwear agents such as zinc dialkyldithiolphosphate (ZDTP). However, ZDDP contains phosphorus and its decomposition products may have deleterious effects on automotive catalyst systems for emission control. Accordingly, there remains an increasing need for methods for reducing friction and wear without adversely affecting emission control systems and without further depleting scarce natural resources.

With regard to the above, exemplary embodiments described herein provide a method for making a self-dispersing cerium oxide nanoparticles additive for lubricants, a lubricant composition containing the nanoparticles and a method for reducing boundary friction using the nanoparticles. The nanoparticles are made by reacting an organo-cerium salt, a fatty acid, and an amine in the substantial absence of water at a temperature ranging from about 150° to about 250° C. for a period of time sufficient to provide nanoparticles while injecting air into the reaction mixture during a portion of the reaction period. The reaction product includes from about 20 to about 40% by weight of the nanoparticles in a substantially organic medium.

In another embodiment, there is provided a method for reducing a friction coefficient adjacent a lubricated surface. The method includes providing an amount of reaction product comprising metal-containing nanoparticles dispersed in a fully formulated lubricant composition containing a base oil of lubricating viscosity, and applying the lubricant composition containing the metal-containing nanoparticles to a surface to be lubricated. The nanoparticles in the reaction product are self-dispersing and are a reaction product of reaction mixture of organo-cerium salt, fatty acid, and amine reacted in the absence of solvent at a temperature ranging from about 150° to about 250° C. for a period of time sufficient to provide nanoparticles. The reaction product includes from about 20 to about 40% by weight of the nanoparticles in a substantially organic medium.

Another embodiment of the disclosure provides a lubricant composition containing a base oil of lubricating viscosity and a boundary friction reducing amount of a reaction product containing metal-containing nanoparticles dispersed in the base oil. The nanoparticles are made by reacting an organo-cerium salt, a fatty acid, and an amine at a temperature ranging from about 150° to about 250° C. in the absence of solvent for a period of time sufficient to provide nanoparticles. The product of the reaction includes from about 20 to about 40% by weight of the nanoparticles in a substantially organic medium.

As set forth briefly above, embodiments of the disclosure provide a unique nanoparticle additive for lubricants and finished lubricant compositions containing the nanoparticle additive that may significantly improve the coefficient of friction of the lubricant composition and may reduce wear for relatively low viscosity lubricant compositions. An additive package containing the nanoparticle reaction product may be mixed with an oleaginous fluid that is applied to a surface between moving parts. In other applications, an additive package containing the metal-containing nanoparticle reaction product may be provided in a fully formulated lubricant composition.

The methods and compositions described herein may also be suitable for reducing emissions of CO and hydrocarbons (HC) from engines lubricated with the lubricant compositions described herein. It is well known that certain metals may be useful for improving the burning efficiency of fuels. For example, metal-containing nanoparticles from the lubricants may enter the combustion chamber by leaking around the piston rings thereby providing a catalytic source suitable for improving fuel combustion without directly adding metal compounds to the fuel. Other features and advantages of the methods described herein may be evident by reference to the following detailed description which is intended to exemplify aspects of the exemplary embodiments without intending to limit the embodiments described herein.

It is to be understood that both the foregoing general description and the following detailed description are exemplary and explanatory only and are intended to provide further explanation of the embodiments disclosed and claimed. The phrases "having the formula" or "have the formula" are intended to be non-limiting with respect to nanoparticles or nanoalloy particles described herein. The formula is given for the purposes of simplification and is intended to represent mono-, di-, tri-, tetra-, and polymetallic nanoparticles.

DETAILED DESCRIPTION OF EMBODIMENTS

For the purposes of this disclosure, the terms "hydrocarbon soluble," "oil soluble," or "dispersable" are not intended to indicate that the compounds are soluble, dissolvable, miscible, or capable of being suspended in a hydrocarbon compound or oil in all proportions. These do mean, however, that they are, for instance, soluble or stably dispersible in oil to an extent sufficient to exert their intended effect in the environment in which the oil is employed. Moreover, the additional incorporation of other additives may also permit incorporation of higher levels of a particular additive, if desired. The terms "self-dispersing" or "self-dispersible"mean the particles, as made, may be dispersed or dissolved in a hydrocarbon material without the use of a dispersing agent.

As used herein, "hydrocarbon" means any of a vast number of compounds containing carbon, hydrogen, and/or oxygen in various combinations. The term "hydrocarbyl" refers to a group having a carbon atom directly attached to the remainder of the molecule and having predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical);

(2) substituted hydrocarbon substituents, that is, substituents containing non-hydrocarbon groups which, in the context of the description herein, do not alter the predominantly hydrocarbon substituent (e.g., halo (especially chloro and fluoro), hydroxy, alkoxy, mercapto, alkylmercapto, nitro, nitroso, and sulfoxy);

(3) hetero-substituents, that is, substituents which, while having a predominantly hydrocarbon character, in the context of this description, contain other than carbon in a ring or chain otherwise composed of carbon atoms. Hetero-atoms include sulfur, oxygen, nitrogen, and encompass substituents such as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

The metal-containing nanoparticles described herein may be uniformly rod-shaped, spherical, or plate-like and will typically have a substantially uniform particle size of less than about 50 nanometers. For example, the rod-shaped nanoparticles may have a particle size ranging from about 1 to about 30 nanometers, desirably from about 5 to about 20 nanometers. Still other particle sizes may range from about 3 to about 6 nanometers. In the case of rod-shaped nanoparticles, "particle size" is determined by the length of the nanoparticle rods. The rod-shaped nanoparticle rods may have an aspect ratio, L/D (Length to Diameter) ranging from about 20 to about 2.

According to the exemplary embodiments described herein, the metal-containing nanoparticles may be made by a relatively simple process. The process is primarily a one step reaction process that includes combining a metal organic compound with a fatty acid and an amine to provide a reaction mixture of metal organic compound in the fatty acid and amine Water, if present, may be removed from the reaction mixture before conducting the reaction. The reaction mixture is then heated to provide a reaction product that includes self-dispersing metal-containing nanoparticles and an organic medium.

An important feature of the reaction process is that the reaction mixture is substantially devoid of water and organic solvent before any reaction takes place. Minor amounts of water may be formed during the reaction, but most, if not all of the water is removed during the reaction due to the use of a reaction temperature that is typically above the boiling point of water. Accordingly, the reaction is considered a "non-aqueous" reaction due to the substantial absence of water.

Another important feature of the reaction process is that the reaction product may be used as made without removing impurities, byproducts and other reaction components. In one embodiment, the reaction product may be subjected to vacuum stripping to remove highly volatile organic compounds from the reaction product. Highly volatile organic compounds include, but are not limited to, compounds that have a boiling point of about 120° C. or less at atmospheric pressure.

In the first step of the process, a metal-organic compound is mixed with a fatty acid and an amine in a ratio of metal-organic compound to amine to acid of from about 1:1:1 to about 1:2:2. A molar ratio of amine to acid in the reaction mixture may range from about 1:1 to about 3:1. By varying the foregoing molar ratios, and/or the reaction temperatures and times, different shaped nanoparticle products may be produced. Molar ratios of ingredients much above 1:2:2 may inhibit the use of the reaction product in lubricant formulations. Molar ratios much below 1:1:1 may result in non self-dispersing nanoparticles.

The amine may be a saturated or unsaturated hydrocarbyl amine having from about 3 to about 24 carbon atoms. Suitable hydrocarbyl amines include, but are not limited to amines of the formula $RNH_2$ in which R is an unsaturated hydrocarbyl radical having from 3 to 24 carbon atoms. A suitable range for R is from 10 to 20 carbon atoms. R may be an aliphatic or a cycloaliphatic, saturated or unsaturated hydrocarbon radical. Typical unsaturated hydrocarbyl amines which can be employed include hexadecylamine, oleylamine, allylamine, furfurylamine, and the like.

The organic acid may be selected from unsaturated fatty acids containing from about 8 to about 26 carbon atoms. Suitable organic acids include, but are not limited to, 2-ethylhexanoic acid, oleic acid, erucic acid, palmitoleic acid, myristoleic acid, linoleic acid, linolenic acid, elaeosteric acid, arachidonic acid and/or ricinoleic acid. Fatty acid mixtures and fractions obtained from natural fats and oils, for example peanut oil fatty acid, fish oil fatty acid, linseed oil fatty acid, palm oil fatty acid, rapeseed oil fatty acid, ricinoleic oil fatty acid, castor oil fatty acid, colza oil fatty acid, soya oil fatty acid, sunflower oil fatty acid, safflower oil fatty acid and tall oil fatty acid, may also be used.

The metal-organic compound is desirably an organo-cerium salt. Examples of organo-cerium salts include but are not limited to cerium (III) acetate and cerium acetyl acetonate.

After forming the reaction mixture, the mixture may be heated for a period of time at elevated temperature to remove any water of crystallization and/or to form a clear solution of reactants. Accordingly, the solution may be heated and held at a temperature ranging from about 50° to about 150° C. for a period of time ranging from about 1 minute to about 1 hour depending on the scale of the reaction mixture. A large volume of reaction mixture may require a longer initial heating time, while a smaller volume may require a shorter initial heating time.

After the initial period of heating the reaction mixture, heating is continued to a temperature ranging from about 150° to about 250° C. for a second period of time ranging from about 1 hour to about 5 hours, depending on the volume of the reaction mixture. Subsequent to the second period of time, the reaction product may be vacuum stripped to remove volatile organic components from the reaction product. Vacuum stripping, if conducted, may be conducted at a pressure of less than about 715 mm of Hg for a period of time ranging from about 1 minute to about 45 minutes.

An advantage of the reaction product includes the ability to use the reaction product as made without any significant purification, solvent washing, and the like. For example, there is no need to purify the reaction product or wash the product with alcohol subsequent to the reaction process. There is also no need to separate the nanoparticles from any unreacted acid or amine components before using the reaction product as an additive in a lubricant composition. Hence, the foregoing process may be useful for making substantially uniform rod-like nanoparticles in a relatively simple reaction process.

The reaction product containing the nanoparticles may include from about 20 to about 40 percent by weight of the nanoparticles and from about 60 to about 80 weight percent of reaction products from the fatty acid and amine reactants. Such reaction products may contain relatively small or insignificant amounts of unreacted acid and amine and/or undesirable by-products. The amount of unreacted components and by-products in the organic medium of the reaction product is typically small enough that the amount of such components has no noticeable effect on the performance of the reaction product in a lubricant composition.

The particle size of the metal-containing nanoparticles may be determined by examining a sample of the particles using TEM (transmission electron microscopy), visually evaluating the grain size and calculating an average grain size therefrom. The particles may have varying particle size due to the very fine grains aggregating or cohering together. However, the particles produced by the foregoing process are typically crystalline nanoparticles having a uniform particle size that is substantially in the range of from 1 to 50 nanometers.

The reaction product described above is advantageously incorporated into lubricating compositions. Accordingly, the reaction product may be added directly to a finished lubricating oil composition. In one embodiment, however, the reaction product may be diluted with a substantially inert, normally liquid organic diluent such as mineral oil, synthetic oil (e.g., ester of dicarboxylic acid), naptha, alkylated (e.g., $C_{10}$-$C_{13}$ alkyl) benzene, toluene or xylene to form an additive concentrate. The additive concentrates may contain from about 0% to about 99% by weight diluent oil mixed with the reaction product.

In the preparation of lubricating oil formulations it is common practice to introduce the additive concentrate in the form of 1 to 99 wt. % active ingredient concentrates in hydrocarbon oil, e.g. mineral lubricating oil, or other suitable solvent. Usually these concentrates may be added to a lubricating oil with a dispersant/inhibitor (DI) additive package and viscosity index (VI) improvers containing 0.01 to 50 parts by weight of lubricating oil per part by weight of the DI package to form finished lubricants, e.g. crankcase motor oils. Suitable DI packages are described for example in U.S. Pat. Nos. 5,204,012 and 6,034,040 for example. Among the types of additives included in the DI additive package are detergents, dispersants, antiwear agents, friction modifiers, seal swell agents, antioxidants, foam inhibitors, lubricity agents, rust inhibitors, corrosion inhibitors, demulsifiers, viscosity index improvers, and the like. Several of these components are well known to those skilled in the art and are used in conventional amounts with the additives and compositions described herein.

Lubricant compositions made with the reaction product containing the metal-containing nanoparticles described above are used in a wide variety of applications. For compression ignition engines and spark ignition engines, it is preferred that the lubricant compositions meet or exceed published API-CI-4 or GF-4 standards. Lubricant compositions according to the foregoing API-CI-4 or GF-4 standards include a base oil, the DI additive package, and/or a VI improver to provide a fully formulated lubricant. The base oil for lubricants according to the disclosure is an oil of lubricating viscosity selected from natural lubricating oils, synthetic lubricating oils and mixtures thereof. Such base oils include those conventionally employed as crankcase lubricating oils for spark-ignited and compression-ignited internal combustion engines, such as automobile and truck engines, marine and railroad diesel engines, and the like.

The reaction product described above may be used in fully formulated automatic transmission fluids, fully formulated crankcase fluids, fully formulated heavy duty gear fluids, and the like. Such nanoparticles may be effective to reduce friction coefficient and wear.

The nanoparticles provided by the reaction product may be present in an amount of up to about 5 wt % in a fully formulated lubricant composition. As another example, the nanoparticles may be present in an amount of about 0.1 to about 5 wt % in a fully formulated lubricant composition. As an even further example, the nanoparticles may be present in an amount of about 0.5 to about 2 wt % in a fully formulated lubricant composition.

Dispersant Components

Dispersants contained in the DI package include, but are not limited to, an oil soluble polymeric hydrocarbon backbone having functional groups that are capable of associating with metal-containing nanoparticles to be dispersed. Typically, the dispersants comprise amine, alcohol, amide, or ester polar moieties attached to the polymer backbone often via a bridging group. Dispersants may be selected from Mannich dispersants as described in U.S. Pat. Nos. 3,697,574 and 3,736,357; ashless succcinimide dispersants as described in U.S. Pat. Nos. 4,234,435 and 4,636,322; amine dispersants as described in U.S. Pat. Nos. 3,219,666, 3,565,804, and 5,633,326; Koch dispersants as described in U.S. Pat. Nos. 5,936,041, 5,643,859, and 5,627,259, and polyalkylene succinimide dispersants as described in U.S. Pat. Nos. 5,851,965; 5,853,434; and 5,792,729.

Oxidation Inhibitor Components

Oxidation inhibitors or antioxidants reduce the tendency of base stocks to deteriorate in service which deterioration can be evidenced by the products of oxidation such as sludge and varnish-like deposits that deposit on metal surfaces and by viscosity growth of the finished lubricant. Such oxidation inhibitors include hindered phenols, sulfurized hindered phenols, alkaline earth metal salts of alkylphenolthioesters having $C_5$ to $C_{12}$ alkyl side chains, sulfurized alkylphenols, metal salts of either sulfurized or nonsulfurized alkylphenols, for example calcium nonylphenol sulfide, ashless oil soluble phenates and sulfurized phenates, phosphosulfurized or sulfurized hydrocarbons, phosphorus esters, metal thiocarbamates, and oil soluble copper compounds as described in U.S. Pat. No. 4,867,890.

Other antioxidants that may be used include sterically hindered phenols and diarylamines, alkylated phenothiazines, sulfurized compounds, and ashless dialkyldithiocarbamates. Non-limiting examples of sterically hindered phenols include, but are not limited to, 2,6-di-tertiary butylphenol, 2,6 di-tertiary butyl methylphenol, 4-ethyl-2,6-di-tertiary butylphenol, 4-propyl-2,6-di-tertiary butylphenol, 4-butyl-2,6-di-tertiary butylphenol, 4-pentyl-2,6-di-tertiary butylphenol, 4-hexyl-2,6-di-tertiary butylphenol, 4-heptyl-2,6-di-tertiary butylphenol, 4-(2-ethylhexyl)-2,6-di-tertiary butylphenol, 4-octyl-2,6-di-tertiary butylphenol, 4-nonyl-2,6-di-tertiary butylphenol, 4-decyl-2,6-di-tertiary butylphenol, 4-undecyl-2,6-di-tertiary butylphenol, 4-dodecyl-2,6-di-tertiary butylphenol, methylene bridged sterically hindered phenols including but not limited to 4,4-methylenebis(6-tert-butyl-o-cresol), 4,4-methylenebis(2-tert-amyl-o-cresol), 2,2- methylenebis(4-methyl-6 tert-butylphenol, 4,4-methylene-bis(2,6-di-tert-butylphenol) and mixtures thereof as described in U.S Publication No. 2004/0266630.

Diarylamine antioxidants include, but are not limited to diarylamines having the formula:

wherein R' and R" each independently represents a substituted or unsubstituted aryl group having from 6 to 30 carbon atoms. Illustrative of substituents for the aryl group include aliphatic hydrocarbon groups such as alkyl having from 1 to 30 carbon atoms, hydroxy groups, halogen radicals, carboxylic acid or ester groups, or nitro groups.

The aryl group is preferably substituted or unsubstituted phenyl or naphthyl, particularly wherein one or both of the aryl groups are substituted with at least one alkyl having from 4 to 30 carbon atoms, preferably from 4 to 18 carbon atoms, most preferably from 4 to 9 carbon atoms. It is desirable that one or both aryl groups be substituted, e.g. mono-alkylated diphenylamine, di-alkylated diphenylamine, or mixtures of mono- and di-alkylated diphenylamines.

The diarylamines may be of a structure containing more than one nitrogen atom in the molecule. Thus the diarylamine may contain at least two nitrogen atoms wherein at least one nitrogen atom has two aryl groups attached thereto, e.g. as in the case of various diamines having a secondary nitrogen atom as well as two aryls on one of the nitrogen atoms.

Examples of diarylamines that may be used include, but are not limited to: diphenylamine; various alkylated diphenylamines; 3-hydroxydiphenylamine; N-phenyl-1,2-phenylenediamine; N-phenyl-1,4-phenylenediamine; monobutyldiphenylamine; dibutyldiphenylamine; mono octyldiphenylamine; dioctyldiphenylamine; mononyldiphenylamine; dinonyldiphenylamine; monotetradecyldiphenylamine; ditetradecyldiphenylamine, phenyl-alpha-naphthylamine; monooctyl phenyl-alpha-naphthylamine; phenyl-beta-naphthylamine; monoheptyldiphenylamine; diheptyldiphenylamine; p-oriented styrenated diphenylamine; mixed butyloctyldiphenylamine; and mixed octylstyryldiphenylamine.

Another class of aminic antioxidants includes phenothiazine or alkylated phenothiazine having the chemical formula:

wherein $R_1$ is a linear or branched $C_1$ to $C_{24}$ alkyl, aryl, heteroalkyl or alkylaryl group and $R_2$ is hydrogen or a linear or branched $C_1$—$C_{24}$ alkyl, heteroalkyl, or alkylaryl group. Alkylated phenothiazine may be selected from the group consisting of monotetradecylphenothiazine, ditetradecylphenothiazine, monodecylphenothiazine, didecylphenothiazine, monononylphenothiazine, dinonylphenothiazine, monoctylphenothiazine, dioctylphenothiazine, monobutylphenothiazine, dibutylphenothiazine, monostyrylphenothiazine, distyrylphenothiazine, butyloctylphenothiazine, and styryloctylphenothiazine.

The sulfur containing antioxidants include, but are not limited to, sulfurized olefins that are characterized by the type of olefin used in their production and the final sulfur content of the antioxidant. High molecular weight olefins, i.e. those olefins having an average molecular weight of 168 to 351 g/mole, are preferred. Examples of olefins that may be used include alpha-olefins, isomerized alpha-olefins, branched olefins, cyclic olefins, and combinations of these.

Alpha-olefins include, but are not limited to, any $C_4$ to $C_{25}$ alpha-olefins. Alpha-olefins may be isomerized before the sulfurization reaction or during the sulfurization reaction. Structural and/or conformational isomers of the alpha olefin that contain internal double bonds and/or branching may also be used. For example, isobutylene is a branched olefin counterpart of the alpha-olefin 1-butene.

Sulfur sources that may be used in the sulfurization reaction of olefins include: elemental sulfur, sulfur monochloride, sulfur dichloride, sodium sulfide, sodium polysulfide, and mixtures of these added together or at different stages of the sulfurization process.

Unsaturated oils, because of their unsaturation, may also be sulfurized and used as an antioxidant. Examples of oils or fats that may be used include corn oil, canola oil, cottonseed oil, grapeseed oil, olive oil, palm oil, peanut oil, coconut oil, rapeseed oil, safflower seed oil, sesame seed oil, soyabean oil, sunflower seed oil, tallow, and combinations of these.

The amount of sulfurized olefin or sulfurized fatty oil delivered to the finished lubricant is based on the sulfur content of the sulfurized olefin or fatty oil and the desired level of sulfur to be delivered to the finished lubricant. For example, a sulfurized fatty oil or olefin containing 20 weight % sulfur, when added to the finished lubricant at a 1.0 weight % treat level, will deliver 2000 ppm of sulfur to the finished lubricant. A sulfurized fatty oil or olefin containing 10 weight % sulfur, when added to the finished lubricant at a 1.0 weight % treat level, will deliver 1000 ppm sulfur to the finished lubricant. It is desirable to add the sulfurized olefin or sulfurized fatty oil to deliver between 200 ppm and 2000 ppm sulfur to the finished lubricant. The foregoing aminic, phenothiazine, and sulfur containing antioxidants are described for example in U.S. Pat. No. 6,599,865.

The ashless dialkyldithiocarbamates which may be used as antioxidant additives include compounds that are soluble or dispersable in the additive package. It is also desired that the ashless dialkyldithiocarbamate be of low volatility, with a molecular weight greater than 250 daltons, desirably, a molecular weight greater than 400 daltons. Examples of ashless dithiocarbamates that may be used include, but are not limited to, methylenebis(dialkyldithiocarbamate), ethylenebis(dialkyldithiocarbamate), isobutyl disulfide-2,2'-bis (dialkyldithiocarbamate), hydroxyalkyl substituted dialkyldithio-carbamates, dithiocarbamates prepared from unsaturated compounds, dithiocarbamates prepared from norbornylene, and dithiocarbamates prepared from epoxides, where the alkyl groups of the dialkyldithiocarbamate can preferably have from 1 to 16 carbons. Examples of dialkyldithiocarbamates that may be used are disclosed in the following patents: U.S. Pat. Nos. 5,693,598; 4,876,375; 4,927, 552; 4,957,643; 4,885,365; 5,789,357; 5,686,397; 5,902,776; 2,786,866; 2,710,872; 2,384,577; 2,897,152; 3,407,222; 3,867,359; and 4,758,362.

Examples of ashless dithiocarbamates are: Methylenebis (dibutyldithiocarbamate), Ethylenebis(dibutyldithiocarbamate), Isobutyl disulfide-2,2'-bis(dibutyldithiocarbamate), Dibutyl-N,N-dibutyl-(dithiocarbamyl)succinate, 2-hydroxypropyl dibutyldithiocarbamate, Butyl(dibutyldithiocarbamyl)acetate, and S-carbomethoxy-ethyl-N,N-dibutyl dithiocarbamate. The most desirable ashless dithiocarbamate is methylenebis(dibutyldithiocarbamate).

Zinc dialkyl dithiophosphates ("Zn DDPs") may also be used in lubricating oils in addition to the nanospherical components. Zn DDPs have good antiwear and antioxidant properties and have been used to pass cam wear tests, such as the Seq. IVA and TU3 Wear Test. Many patents address the manufacture and use of Zn DDPs including U.S. Pat. Nos. 4,904,401; 4,957,649; and 6,114,288. Non-limiting general Zn DDP types are primary, secondary and mixtures of primary and secondary Zn DDPs Likewise, organomolybdenum containing compounds used as friction modifiers may also exhibit antioxidant functionality. U.S. Pat. No. 6,797,677 describes a combination of organomolybdenum compound, alkylphenothizine and alkyldiphenylamines for use in finished lubricant formulations. Examples of suitable molybdenum containing friction modifiers are described below under friction modifiers.

The reaction products described herein may be used with any or all of the foregoing antioxidants in any and all combinations and ratios. It is understood that various combinations of phenolic, aminic, sulfur containing and molybdenum containing additives may be optimized for the finished lubricant formulation based on bench or engine tests or modifications of the dispersant, VI improver, base oil, or any other additive.

Friction Modifier Components

A sulfur- and phosphorus-free organomolybdenum compound that may be used as an additional friction modifier may be prepared by reacting a sulfur- and phosphorus-free molybdenum source with an organic compound containing amino and/or alcohol groups. Examples of sulfur- and phosphorus-free molybdenum sources include molybdenum trioxide, ammonium molybdate, sodium molybdate and potassium molybdate. The amino groups may be monoamines, diamines, or polyamines. The alcohol groups may be mono-substituted alcohols, diols or bis-alcohols, or polyalcohols. As an example, the reaction of diamines with fatty oils produces a product containing both amino and alcohol groups that can react with the sulfur- and phosphorus-free molybdenum source.

Examples of sulfur- and phosphorus-free organomolybdenum compounds include the following:

(1) Compounds prepared by reacting certain basic nitrogen compounds with a molybdenum source as described in U.S. Pat. Nos. 4,259,195 and 4,261,843.
(2) Compounds prepared by reacting a hydrocarbyl substituted hydroxy alkylated amine with a molybdenum source as described in U.S. Pat. No. 4,164,473.
(3) Compounds prepared by reacting a phenol aldehyde condensation product, a mono-alkylated alkylene diamine, and a molybdenum source as described in U.S. Pat. No. 4,266,945.
(4) Compounds prepared by reacting a fatty oil, diethanolamine, and a molybdenum source as described in U.S. Pat. No. 4,889,647.
(5) Compounds prepared by reacting a fatty oil or acid with 2-(2-aminoethyl)aminoethanol, and a molybdenum source as described in U.S. Pat. No. 5,137,647.
(6) Compounds prepared by reacting a secondary amine with a molybdenum source as described in U.S. Pat. No. 4,692,256.
(7) Compounds prepared by reacting a diol, diamino, or amino-alcohol compound with a molybdenum source as described in U.S. Pat. No. 5,412,130.
(8) Compounds prepared by reacting a fatty oil, mono-alkylated alkylene diamine, and a molybdenum source as described in U.S. Pat. No. 6,509,303.
(9) Compounds prepared by reacting a fatty acid, mono-alkylated alkylene diamine, glycerides, and a molybdenum source as described in U.S. Pat. No. 6,528,463.

Molybdenum compounds prepared by reacting a fatty oil, diethanolamine, and a molybdenum source as described in U.S. Pat. No. 4,889,647 are sometimes illustrated with the following structure, where R is a fatty alkyl chain, although the exact chemical composition of these materials is not fully known and may in fact be multi-component mixtures of several organomolybdenum compounds.

Sulfur-containing organomolybdenum compounds may be used and may be prepared by a variety of methods. One method involves reacting a sulfur and phosphorus-free molybdenum source with an amino group and one or more sulfur sources. Sulfur sources can include for example, but are not limited to, carbon disulfide, hydrogen sulfide, sodium sulfide and elemental sulfur. Alternatively, the sulfur-containing molybdenum compound may be prepared by reacting a sulfur-containing molybdenum source with an amino group or thiuram group and optionally a second sulfur source.

Examples of sulfur- and phosphorus-free molybdenum sources include molybdenum trioxide, ammonium molybdate, sodium molybdate, potassium molybdate, and molybdenum halides. The amino groups may be monoamines, diamines, or polyamines. As an example, the reaction of molybdenum trioxide with a secondary amine and carbon disulfide produces molybdenum dithiocarbamates. Alternatively, the reaction of $(NH_4)_2Mo_3S_{13}*n(H_2O)$ where n varies between 0 and 2, with a tetralkylthiuram disulfide, produces a trinuclear sulfur-containing molybdenum dithiocarbamate.

Examples of sulfur-containing organomolybdenum compounds appearing in patents and patent applications include the following:

(1) Compounds prepared by reacting molybdenum trioxide with a secondary amine and carbon disulfide as described in U.S. Pat. Nos. 3,509,051 and 3,356,702.
(2) Compounds prepared by reacting a sulfur-free molybdenum source with a secondary amine, carbon disulfide, and an additional sulfur source as described in U.S. Pat. No. 4,098,705.
(3) Compounds prepared by reacting a molybdenum halide with a secondary amine and carbon disulfide as described in U.S. Pat. No. 4,178,258.
(4) Compounds prepared by reacting a molybdenum source with a basic nitrogen compound and a sulfur source as described in U.S. Pat. Nos. 4,263,152, 4,265,773, 4,272,387, 4,285,822, 4,369,119, and 4,395,343.
(5) Compounds prepared by reacting ammonium tetrathiomolybdate with a basic nitrogen compound as described in U.S. Pat. No. 4,283,295.
(6) Compounds prepared by reacting an olefin, sulfur, an amine and a molybdenum source as described in U.S. Pat. No. 4,362,633.
(7) Compounds prepared by reacting ammonium tetrathiomolybdate with a basic nitrogen compound and an organic sulfur source as described in U.S. Pat. No. 4,402,840.

(8) Compounds prepared by reacting a phenolic compound, an amine and a molybdenum source with a sulfur source as described in U.S. Pat. No. 4,466,901.
(9) Compounds prepared by reacting a triglyceride, a basic nitrogen compound, a molybdenum source, and a sulfur source as described in U.S. Pat. No. 4,765,918.
(10) Compounds prepared by reacting alkali metal alkylthioxanthate salts with molybdenum halides as described in U.S. Pat. No. 4,966,719.
(11) Compounds prepared by reacting a tetralkylthiuram disulfide with molybdenum hexacarbonyl as described in U.S. Pat. No. 4,978,464.
(12) Compounds prepared by reacting an alkyl dixanthogen with molybdenum hexacarbonyl as described in U.S. Pat. No. 4,990,271.
(13) Compounds prepared by reacting alkali metal alkylxanthate salts with dimolybdenum tetra-acetate as described in U.S. Pat. No. 4,995,996.
(14) Compounds prepared by reacting $(NH_4)_2 Mo_3S_{13}*2H_2O$ with an alkali metal dialkyldithiocarbamate or tetralkyl thiuram disulfide as described in U.S. Pat. No. 6,232,276.
(15) Compounds prepared by reacting an ester or acid with a diamine, a molybdenum source and carbon disulfide as described in U.S. Pat. No. 6,103,674.
(16) Compounds prepared by reacting an alkali metal dialkyldithiocarbamate with 3-chloropropionic acid, followed by molybdenum trioxide, as described in U.S. Pat. No. 6,117,826.

Molybdenum dithiocarbamates may be illustrated by the following structure, where R is an alkyl group containing 4 to 18 carbons or H, and X is O or S.

Glycerides may also be used alone or in combination with other friction modifiers. Suitable glycerides include glycerides of the formula:

wherein each R is independently selected from the group consisting of H and C(O)R' where R' may be a saturated or an unsaturated alkyl group having from 3 to 23 carbon atoms. Examples of glycerides that may be used include glycerol monolaurate, glycerol monomyristate, glycerol monopalmitate, glycerol monostearate, and monoglycerides derived from coconut acid, tallow acid, oleic acid, linoleic acid, and linolenic acids. Typical commercial monoglycerides contain substantial amounts of the corresponding diglycerides and triglycerides. These materials are not detrimental to the production of the molybdenum compounds, and may in fact be more active. Any ratio of mono- to di-glyceride may be used, however, it is preferred that from 30 to 70% of the available sites contain free hydroxyl groups (i.e., 30 to 70% of the total R groups of the glycerides represented by the above formula are hydrogen). A preferred glyceride is glycerol monooleate, which is generally a mixture of mono, di, and tri-glycerides derived from oleic acid, and glycerol.

Additional Additives

Rust inhibitors selected from the group consisting of nonionic polyoxyalkylene polyols and esters thereof, polyoxyalkylene phenols, and anionic alkyl sulfonic acids may be used.

A small amount of a demulsifying component may be used. A suitable demulsifying component is described in EP 330, 522. Such demulsifying component may be obtained by reacting an alkylene oxide with an adduct obtained by reacting a bis-epoxide with a polyhydric alcohol. The demulsifier should be used at a level not exceeding 0.1 mass % active ingredient. A treat rate of 0.001 to 0.05 mass % active ingredient is convenient.

Pour point depressants, otherwise known as lube oil flow improvers, lower the minimum temperature at which the fluid will flow or can be poured. Such additives are well known. Typical of those additives which improve the low temperature fluidity of the fluid are $C_8$ to $C_{18}$ dialkyl fumarate/vinyl acetate copolymers, polyalkylmethacrylates and the like.

Foam control can be provided by many compounds including an antifoamant of the polysiloxane type, for example, silicone oil or polydimethyl siloxane.

Seal swell agents, as described, for example, in U.S. Pat. Nos. 3,794,081 and 4,029,587, may also be used.

Viscosity modifiers (VM) function to impart high and low temperature operability to a lubricating oil. The VM used may have that sole function, or may be multifunctional, that is, the VM may also function as dispersants.

Suitable viscosity modifiers are polyisobutylene, copolymers of ethylene and propylene and higher alpha-olefins, polymethacrylates, polyalkylmethacrylates, methacrylate copolymers, copolymers of an unsaturated dicarboxylic acid and a vinyl compound, interpolymers of styrene and acrylic esters, and partially hydrogenated copolymers of styrene/isoprene, styrene/butadiene, and isoprene/butadiene, as well as the partially hydrogenated homopolymers of butadiene and isoprene and isoprene/divinylbenzene.

Functionalized olefin copolymers that may be used include interpolymers of ethylene and propylene which are grafted with an active monomer such as maleic anhydride and then derivatized with an alcohol or amine. Other such copolymers are copolymers of ethylene and propylene which are grafted with nitrogen compounds.

Each of the foregoing additives, when used, is used at a functionally effective amount to impart the desired properties to the lubricant. Thus, for example, if an additive is a corrosion inhibitor, a functionally effective amount of this corrosion inhibitor would be an amount sufficient to impart the desired corrosion inhibition characteristics to the lubricant. Generally, the concentration of each of these additives, when used, ranges up to about 20% by weight based on the weight of the lubricating oil composition, and in one embodiment from about 0.001% to about 20% by weight, and in one embodiment about 0.01% to about 10% by weight based on the weight of the lubricating oil composition.

The reaction products containing metal-containing nanoparticles may be added directly to the lubricating oil composition. In one embodiment, however, the reaction product is diluted with a substantially inert, normally liquid organic diluent such as mineral oil, synthetic oil, naphtha, alkylated (e.g. $C_{10}$ to $C_{13}$ alkyl) benzene, toluene or xylene to form an additive concentrate. These concentrates usually contain from about 1% to about 100% by weight and in one embodiment about 10% to about 90% by weight of the reaction product.

Base Oils

Base oils suitable for use in formulating the compositions, additives and concentrates described herein may be selected from any of the synthetic or natural oils or mixtures thereof. The synthetic base oils include alkyl esters of dicarboxylic acids, polyglycols and alcohols, poly-alpha-olefins, including polybutenes, alkyl benzenes, organic esters of phosphoric acids, polysilicone oils, and alkylene oxide polymers, interpolymers, copolymers and derivatives thereof where the terminal hydroxyl groups have been modified by esterification, etherification, and the like. The synthetic oils may also include the gas to liquid synthetic oils.

Natural base oils include animal oils and vegetable oils (e.g., castor oil, lard oil), liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. The base oil typically has a viscosity of about 2.5 to about 15 cSt and preferably about 2.5 to about 11 cSt at 100° C.

Representative effective amounts of the metal-containing nanoparticles and additives, when used in crankcase lubricants, are listed in Table 1 below. All the values listed are stated as weight percent active ingredient.

TABLE 1

| Component | Wt. % (Broad) | Wt. % (Typical) |
|---|---|---|
| Dispersant | 0.5-5.0 | 1.0-2.5 |
| Antioxidant system | 0-5.0 | 0.01-3.0 |
| Metal Detergents | 0.1-15.0 | 0.2-8.0 |
| Corrosion Inhibitor | 0-5.0 | 0-2.0 |
| Metal dihydrocarbyl dithiophosphate | 0.1-6.0 | 0.1-4.0 |
| Nanoparticles from reaction product | 0.1-5.0 | 0.1-3.0 |
| Antifoaming agent | 0-5.0 | 0.001-0.15 |
| Friction Modifier | 0-5.0 | 0-2.0 |
| Supplemental antiwear agents | 0-1.0 | 0-0.8 |
| Pour point depressant | 0.01-5.0 | 0.01-1.5 |
| Viscosity modifier | 0.01-10.00 | 0.25-7.0 |
| Base oil | balance | balance |
| Total | 100 | 100 |

The following examples are given for the purpose of exemplifying aspects of the embodiments and are not intended to limit the embodiments in any way.

Example 1

Production of Cerium Oxide Nanoparticles

Figure 1:
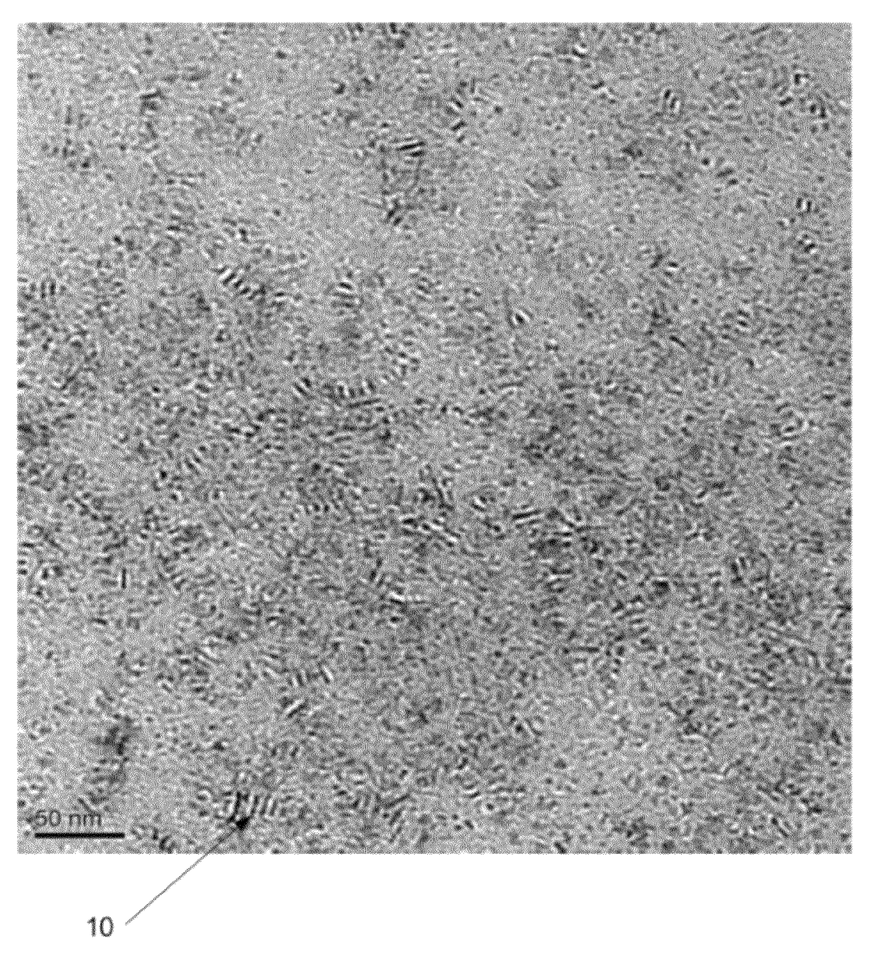
FIG. 1 is photomicrograph of rod-shaped nanoparticles made according to an embodiment of the disclosure.

The following procedure was used to produce cerium oxide nanoparticles having a particle size of less than 20 nanometers. Cerium (III) acetate (60 gram, 0.189 moles) was mixed with 90 grams (0.336 moles) of oleylamine and 90 grams (0.319 moles) of oleic acid in a suitable vessel. The mixture was heated to 120° C. and held at that temperature for 1 hour to dissolve all of the reactants and provide a clear reaction solution. Next, a tube was inserted into the reaction mixture subsurface for air introduction into the reaction mixture. The air flow was started and the temperature of the reaction mixture was increased to 220° C. and held at that temperature for 3 hours. The reaction product was stripped at 711 mm Hg for 15 minutes to remove any highly volatile organic material. The product was then filtered. X-ray diffraction confirmed that nanoparticles of crystalline cerium oxide 10 were produced as shown in FIG. 1. The reaction product had the following elemental analysis.

TABLE 2

| Element | Atomic % | Weight % |
|---|---|---|
| Carbon | 61.07 | 35.81 |
| Oxygen | 33.35 | 26.01 |
| Ce | 5.57 | 38.18 |

Example 2

Boundary Friction Coefficients of Cerium Oxide Nanoparticles in a PCMO

The effectiveness of a reduction in the boundary friction coefficients for a fully formulated passenger car motor oil (PCMO) containing dispersants, detergents, antioxidants, viscosity modifiers, pour point depressants, and antifoam agents according to Table 1 is provided in the following Table. The fully formulated PCMO did not contain additional metal free or metal-containing friction modifiers other than as indicated in the following table.

TABLE 3

| Sample No. | | Boundary Friction Coefficient at 130° C. | % Reduction in Friction versus Group II Base Oil |
|---|---|---|---|
| 1 | PCMO (no additive) | 0.150 +/− 0.002 | 0% |
| 2 | PCMO + 1.0 wt. % glycerol monooleate | 0.11 +/− 0.002 | 26.7% |
| 3 | PCMO + 1.0 wt. % $CeO_2$ spheres | 0.078 +/− 0.004 | 48.0% |
| 4 | PCMO + 1.0 wt. % oleic acid | 0.065 +/− 0.005 | 56.7% |
| 5 | PCMO + 1.0 wt. % $CeO_2$ rods | 0.075 +/− 0/004 | 50.0% |

Example 3

In a reaction vial, 2 grams (0.0063 moles) Cerium (III) Acetate, 3 grams (0.0106 moles) Oleic Acid, and 3 grams (0.0112 moles) Oleylamine were heated to 120° C. while stirring. After 1 hour, the temperature was increased to 220° C. and a glass tube was inserted into the reaction mixture and air was delivered at approximately 800 standard cubic centimeters per minute (sccm). After 3 hours, the tube was removed and the reaction mixture was cooled to room temperature. The reaction yielded 7.5 g of reaction products. A 1% by weight solution of the additive in a friction modifier-free engine oil lubricant was prepared. The solution had a slight amount of visible particulates. The coefficient of friction ($\mu$). measured by a high frequency reciprocating rig (HFRR), was 0.085.

Example 4

Additional experiments were conducted, following the procedure for Example 3, wherein the ratios of the starting reagents were adjusted to improve solubility of the cerium oxide nanoparticles in a base oil, while retaining the low coefficient of friction. Solutions of the reaction products were prepared at 1 wt. % in the base oil followed by HFFR tests and observation for insoluble particulate matter in the base oil solutions. The results are summarized in the table below. The coefficient of friction ($\mu$) was determined by HFRR at 130° C. on steel, 4N and 20 Hz.

TABLE 4

| Run No. | Cerium Acetate (grams) | Oleic Acid (grams) | Oleylamine (grams) | Particulates | μ |
|---|---|---|---|---|---|
| 1 | 1 | 1 | 1 | Y | 0.125 |
| 2 | 1 | 1 | 2 | Y | 0.120 |
| 3 | 1 | 2 | 2 | N | 0.137 |
| 4 | 1 | 2 | 1 | N | 0.126 |
| 5 | 1 | 3 | 3 | N | 0.113 |
| 6 | 2 | 3 | 3 | Y | 0.112 |
| 7 | 2 | 3 | 4 | N | 0.114 |

Example 5

In a reaction vial, 6 grams (0.0189 moles) Cerium (III) Acetate, 9 grams (0.0624 moles) ethylhexanoic acid, and 12 grams (0.0448 moles) Oleylamine were heated to 120° C. while stirring. After 1 hour, the temperature was increased to 220° C. and a glass tube was inserted into the reaction mixture and air was delivered at approximately 800 sccm. After 3 hours, the tube was removed and the reaction mixture was cooled to room temperature. The reaction yielded 23.7 g of reaction products. A 0.5% by weight solution of the additive in a friction modifier-free engine oil lubricant was prepared. The solution was haze-free. The coefficient of friction (μ) measured by HFRR was 0.135 (compared to 0.156 for the base formulation without a friction modifier).

Example 6

In a reaction vial, 6 grams (0.0189 moles) Cerium (III) Acetate, 9 grams (0.0319 moles) oleic acid, and 5 grams (0.0387 moles) 2-ethylhexylamine were heated to 120° C. while stirring. After 1 hour, the temperature was increased to 195° C. and a glass tube was inserted into the reaction mixture and air was delivered at approximately 800 sccm. After 3 hours, the tube was removed and the reaction mixture was cooled to room temperature. The reaction yielded 11.0 g of reaction products. A 0.5% by weight solution of the additive in a friction modifier-free engine oil lubricant was prepared. The solution was haze-free. The coefficient of friction (μ) measured by HFRR was 0.127 (compared to 0.158 for the base formulation without a friction modifier).

As shown by the foregoing results, the cerium oxide nanoparticles are statistically more effective at reducing boundary friction at 1.0 wt. % than glycerol monooleate. Further the results showed that 1.0 wt. % cerium oxide nanoparticles was statistically as effective for reducing boundary friction coefficients as oleic acid used at the same concentration in the PCMO.

It is expected that formulations containing the reaction product in an amount sufficient to provided from about 0.1 to about 5.0 wt. % or more cerium oxide nanoparticles will enable a reduction in the amount of conventional antiwear agents, such as sulfur and/or phosphorus containing compounds, needed thereby improving the performance of pollution control equipment on vehicles while achieving a similar or improved friction coefficient performance or benefit and little or no adverse effect on the corrosiveness of the oil.

At numerous places throughout this specification has been made to a number of U.S. patents. All such cited documents are expressly incorporated in full into this disclosure as if fully set forth herein.

The foregoing embodiments are susceptible to considerable variation in its practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

The invention claimed is:

1. A method for reducing a friction coefficient adjacent a lubricated surface, comprising providing an amount of reaction product comprising metal-containing nanoparticles dispersed in a fully formulated lubricant composition containing a base oil of lubricating viscosity, and applying the lubricant composition containing the reaction product to a surface to be lubricated, wherein the nanoparticles in the reaction product are self-dispersing and the reaction product is made by an improved process of reacting an organo-cerium salt, a fatty acid, and an amine in a reaction mixture in the absence of solvent at a temperature ranging from about 150° to about 250° C., wherein the improvement comprises reacting the organo-cerium salt, a fatty acid, and an amine in a molar ratio ranging from about 1:1:1 to about 1:2:2 in the reaction mixture and under an atmosphere selected from the group consisting of air, oxygen, nitrogen, and argon which is delivered subsurface to the reaction mixture to provide the reaction product comprising from about 20 to about 40% by weight of the nanoparticles in a substantially organic medium.

2. The method of claim 1, wherein the nanoparticles are selected from the group consisting of rod-shaped nanoparticles, spherical nanoparticles, and plate shaped nanoparticles.

3. The method of claim 1, wherein the atmosphere comprises air and the air is delivered subsurface to the reaction mixture.

4. The method of claim 1, wherein the organo-cerium salt comprises cerium (III) acetate.

5. The method of claim 1, wherein the substantially organic medium is substantially devoid of water and comprises reaction products of the acid and amine components.

6. The method of claim 1, wherein the reaction mixture is substantially devoid of water.

7. The method of claim 1, wherein the amount of metal-containing nanoparticles in the fully formulated lubricant composition ranges up to about 5 percent by weight.

8. The method of claim 1, wherein the amount of metal-containing nanoparticles in the fully formulated lubricant composition ranges from about 0.1 to about 2 percent by weight.

9. A method for making a self-dispersing cerium oxide nanoparticles additive for lubricants by an improved process of reacting a mixture of organo-cerium salt, fatty acid, and amine in the substantial absence of water and organic solvent at a temperature ranging from about 150° to about 250° C., wherein the improvement comprises providing a reaction mixture having a molar ratio of organo-cerium salt to amine to fatty acid ranging from about 1:1:1 to about 1:2:2 in the reaction mixture providing the reaction mixture under an atmosphere selected from the group consisting of air, oxygen, nitrogen, and argon which is delivered subsurface to the reaction mixture to provide a reaction product comprising from about 20 to about 40% by weight of the nanoparticles in a substantially organic medium.

10. The method of claim 7, wherein the nanoparticles as made in the reaction product are self-dispersing in a lubricant composition.

11. The method of claim 7, wherein the nanoparticles are selected from the group consisting of rod-shaped nanoparticles, spherical nanoparticles, and plate shaped nanoparticles having a size ranging from about 1 to about 50 nanometers.

12. The method of claim 7, wherein the organo-cerium salt comprises cerium (III) acetate.

13. The method of claim 7, wherein the substantially organic medium is substantially devoid of water and comprises reaction products of the acid and amine components.

14. The method of claim 7, wherein the reaction mixture is substantially devoid of water.

15. The method of claim 9, wherein the improvement further comprises injecting air into the mixture during a portion of the reaction period.

16. A lubricant composition comprising up to about 5 weight percent of metal-containing nanoparticles made by the method of claim 7.

17. A lubricant composition comprising:
a base oil of lubricating viscosity; and
a boundary friction reducing amount of a reaction product comprising self-dispersing metal-containing nanoparticles dispersed in the base oil, wherein the reaction product is made by an improved process of reacting a mixture of organo-cerium salt, a fatty acid, and an amine reacted in the absence of solvent at a temperature ranging from about 150° to about 250° C., wherein the improvement comprises reacting the organo-cerium salt, a fatty acid, and an amine in a molar ratio ranging from about 1:1:1 to about 1:2:2 in the reaction mixture under an atmosphere selected from the group consisting of air, oxygen, nitrogen, and argon which is delivered subsurface to the reaction mixture to provide the reaction product comprising from about 20 to about 40% by weight of the nanoparticles in a substantially organic medium.

18. The lubricant composition of claim 17, wherein the organo-cerium salt comprises cerium (III) acetate.

19. The lubricant composition of claim 17, wherein the substantially organic medium is substantially devoid of water and comprises reaction products of the acid and amine components.

20. The lubricant composition of claim 17, wherein the reaction mixture is substantially devoid of water.

21. The lubricant composition of claim 17, wherein the amount of metal-containing nanoparticles dispersed in the base oil ranges up to about 5 percent by weight.

22. The lubricant composition of claim 17, wherein the nanoparticles are selected from the group consisting of rod-shaped nanoparticles, spherical nanoparticles, and plate shaped nanoparticles having a size ranging from about 1 to about 50 nanometers.

23. The lubricant composition of claim 17, wherein the fatty acid comprises an unsaturated fatty acid containing from about 10 to about 26 carbon atoms.

24. The lubricant composition of claim 17, wherein the amine comprises an unsaturated hydrocarbyl amine containing from about 3 to about 24 carbon atoms.

* * * * *